(12) United States Patent
Born et al.

(10) Patent No.: US 8,651,795 B2
(45) Date of Patent: Feb. 18, 2014

(54) SYSTEM FOR LOADING, HANDLING, AND TRANSPORTING CONTAINERS

(75) Inventors: Michael C. Born, Downers Grove, IL (US); Brian C. Born, Schererville, IN (US); Roni Gregori, Dyer, IN (US); William M. Smith, Kewanee, IL (US)

(73) Assignee: MI-BOX Holding Co., Inc., Joliet, IL (US)

( * ) Notice: Subject to any disclaimer, the term of this patent is extended or adjusted under 35 U.S.C. 154(b) by 1554 days.

(21) Appl. No.: 11/230,753

(22) Filed: Sep. 20, 2005

(65) Prior Publication Data

US 2007/0071586 A1 Mar. 29, 2007

(51) Int. Cl.
*B26B 1/00* (2006.01)

(52) U.S. Cl.
USPC .......................................... 414/491

(58) Field of Classification Search
USPC ......... 414/544, 629, 634, 491, 631, 428, 685, 414/603
See application file for complete search history.

(56) References Cited

U.S. PATENT DOCUMENTS

| | | | |
|---|---|---|---|
| 2,437,806 A * | 3/1948 | Dempster | 414/544 |
| 2,464,071 A * | 3/1949 | Coffing | 414/546 |
| 3,235,105 A * | 2/1966 | Loomis | 414/544 |
| 3,305,047 A * | 2/1967 | Bronder | 414/685 |
| 3,521,780 A * | 7/1970 | Cook | 414/632 |
| 3,754,777 A | 8/1973 | Riggs et al. | |
| 4,071,147 A | 1/1978 | Hornagold | |
| 4,365,921 A * | 12/1982 | Brouwer et al. | 414/347 |
| 4,415,302 A * | 11/1983 | Brouwer et al. | 414/416.04 |
| 4,527,458 A | 7/1985 | Johnson | |
| 4,778,327 A * | 10/1988 | Tufenkian et al. | 414/541 |
| 5,007,543 A | 4/1991 | Cooke | |
| 5,391,043 A * | 2/1995 | Bohata et al. | 414/544 |
| 5,706,960 A | 1/1998 | Pitman et al. | |
| 5,967,736 A * | 10/1999 | Poindexter | 414/549 |
| 6,019,567 A * | 2/2000 | Lutkus et al. | 414/549 |
| 6,071,062 A | 6/2000 | Warhurst et al. | |
| 6,077,028 A * | 6/2000 | Hassenplug et al. | 414/754 |
| 6,155,770 A | 12/2000 | Warhurst et al. | |
| 7,074,004 B2 * | 7/2006 | Lockamy et al. | 414/549 |
| 7,150,472 B1 | 12/2006 | Schneider | |
| 7,241,100 B2 * | 7/2007 | Lockamy et al. | 414/549 |
| 7,264,437 B2 * | 9/2007 | Lockamy et al. | 414/812 |
| 7,270,511 B2 * | 9/2007 | Lockamy et al. | 414/549 |

* cited by examiner

*Primary Examiner* — Joshua Rudawitz
(74) *Attorney, Agent, or Firm* — McAndrews, Held & Malloy, Ltd.

(57) ABSTRACT

A system for lifting, handling, and transporting containers includes a trailer that is either connectable to a truck or permanently affixed to a truck. The trailer has front and rear ends and is configured to receive and hold a container. A dolly is mounted on the trailer to lift and handle the container while maintaining the container in an upright orientation. The dolly travels between the front and rear ends of the trailer.

4 Claims, 10 Drawing Sheets

SYSTEM FOR LOADING, HANDLING, AND TRANSPORTING CONTAINERS

BACKGROUND OF THE INVENTION

Embodiments of the present invention generally relate to a system for transporting containers, and more particularly to a vehicle or trailer that includes an apparatus for lifting, handling, and transporting a container.

The freight and shipping industries often have requirements related to lifting and transporting containers. Centralized locations typically include cranes, forklifts, or other apparatus for lifting and handling containers. In the field, however, no such apparatus for lifting and handling containers exists. Thus, vehicles such as trucks must be equipped with their own apparatus for loading and unloading containers at remote locations. Additionally, certain laws impose certain width maximums for road travel. Both the trucks and the containers they carry must meet those width restraints. Thus, it is desirable to have trucks capable of carrying containers as wide as possible while not exceeding those width restraints.

U.S. Pat. Nos. 6,071,062 and 6,155,770, issued to Pods, Inc., employ a truck that can load and unload specially configured containers at remote locations and transport those containers.

The embodiments shown in the '062 and '770 patents disclose a truck having an apparatus for loading, unloading, and carrying containers of substantially the same width as that of the truck itself. The truck includes a carrier frame that detaches from the truck for loading the specially configured containers. The carrier frame, like the container, is rectangularly shaped. When the carrier frame is detached from the truck's platform, it can be moved into position to surround, engage, and lift the container. Before the carrier frame detaches from the truck's platform, the carrier frame's wheels must descend to contact the ground and the carrier frame's width must be increased by extending the carrier frame's transverse bars. The carrier frame's width is increased to clear both the truck and the container so that it is movable from a position surrounding the truck's platform to a position surrounding the container. After the carrier frame surrounds the container, it engages the container with chains and hooks. The container is then lifted by the carrier frame, which is itself lifted by hydraulic actuators. After the container is lifted sufficiently high enough to clear the truck's platform, the carrier frame (now with the container) is moved back to its original position surrounding the truck's platform. The container is then lowered onto the platform. Thereafter, the carrier frame's width is reduced, the carrier frame is secured to the platform, and the carrier frame's wheels are raised.

Although the truck disclosed in the '062 and '770 patents is a self-contained apparatus for lifting, handling, and transporting containers of a desirable width, its components are cumbersome and complex. Furthermore, loading and unloading of the truck is time consuming and inefficient.

Thus, a need exists for a vehicle for lifting, handling, and transporting containers of a desirable width that can be used to quickly and easily load and unload containers and transport them within the width restraints imposed by law.

BRIEF SUMMARY OF THE INVENTION

Certain embodiments of the present invention provide a system for lifting, handling, and transporting containers. The system employs a trailer that is either connectable to a truck or integral with a truck. The trailer is equipped with channels that allow a wheeled dolly to travel back and forth between front and rear ends of the trailer. The dolly is positioned at or near the front end during travel and at or near the rear end during lifting and lowering of a container. In an embodiment of the invention, the dolly is propelled forward and rearward by a pair of hydraulic actuators that work in a complimentary manner. Alternatively, the dolly can be moved relative to the truck and trailer with a winch and cable system or by driving the vehicle after securing the dolly in place with respect to the ground by deploying outriggers against the ground.

The dolly also includes lifting apparatus extending rearward. In an embodiment of the invention, the lifting apparatus includes yoke arms that rotate about an axis and are driven by hydraulic actuators. Distal ends of the yoke arms include a cradle with removable lifting extensions for lifting a container. The cradle is rotatable about the distal ends so that the cradle can maintain a level orientation with respect to the ground despite that the yoke arms rotate with respect to the ground. By remaining level with the ground, the cradle can lift and handle the container while maintaining the container in an upright orientation. In an embodiment of the invention, hydraulic actuators control the rotation of the cradles. Medial sides of the cradles include apparatus for attaching removable lifting extensions. The lifting extensions are configured to be insertable into and removable from corresponding holes of a container.

After the dolly lifts a container, the dolly is moved back to the front end of the trailer, and the dolly lowers the container onto a remaining portion of the trailer.

Figure 1:
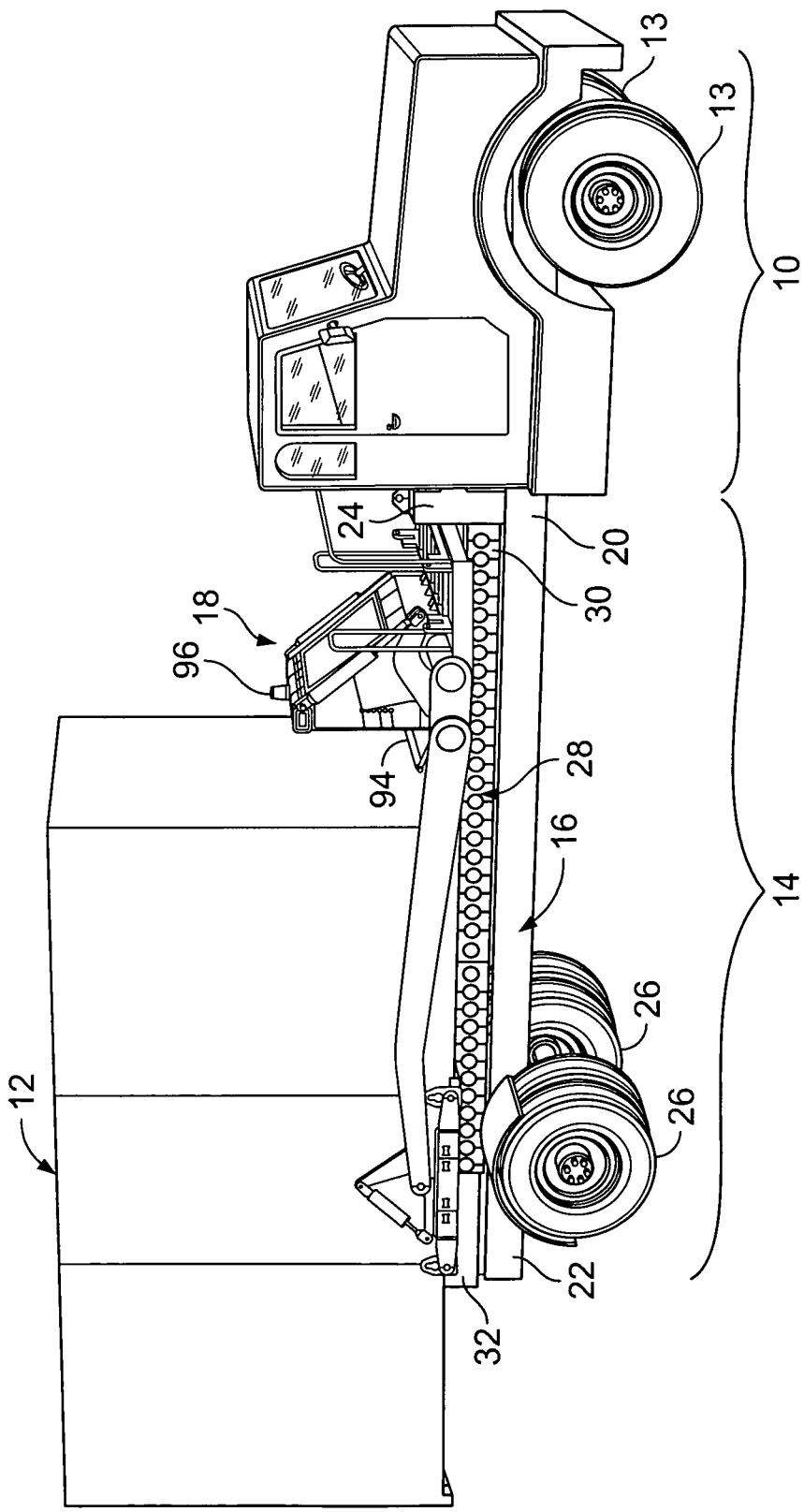
FIG. 1 illustrates an isometric view of a truck with trailer and container, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a truck 10 for lifting, handling, and transporting a box-shaped container 12. The truck 10 includes ground-engaging wheels 13 and a trailer 14 that may be permanently affixed to the truck 10. Alternatively, the trailer 14 may be connectable to and detachable from the truck 10 through conventional truck-to-trailer connecting means. The trailer 14 includes a mounted dolly 18 for lifting and handling containers 12. The dolly 18 is rollable along the trailer 14.

Figure 2:
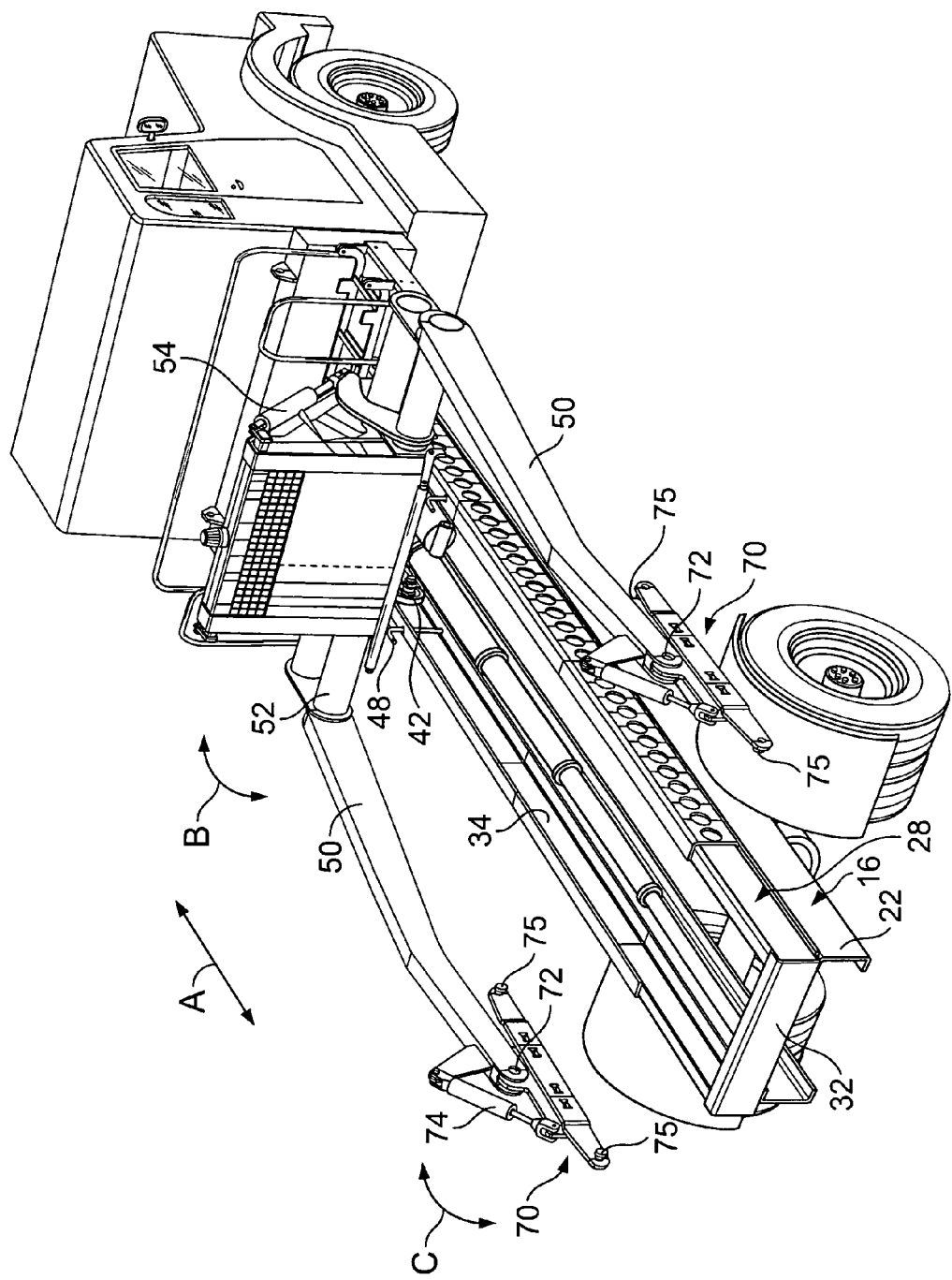
FIG. 2 illustrates an isometric view of a truck with trailer, according to an embodiment of the present invention.

With reference to FIGS. 1 and 2, the trailer 14 includes left and right steel bars 16 that run longitudinally between front and rear ends 20 and 22 of the trailer 14. The trailer 14 includes a ballast 24 located proximate the front end 20 and ground-engaging wheels 26 proximate the rear end 22. The steel bars 16 buttress a channel support structure 28 having a front end 30 and a rear end 32. The front end 30 of the channel support structure 28 is proximate with the front end 20 of the trailer 14 while the rear end 32 of the channel support structure 28 is proximate with the rear end 22 of the trailer 14. The channel support structure 28 includes left and right channels 34 and 36 (illustrated in FIGS. 2 and 3, respectively) extending between the front and rear ends 30 and 32. The left and right channels 34 and 36 are configured to allow dolly wheels 42 to roll therein. Rolling of the dolly wheels 42 within the left and right channels 34 and 36 allows the dolly 18 to move back and forth in the directions designated by arrow A in FIG. 2.

Figure 4:
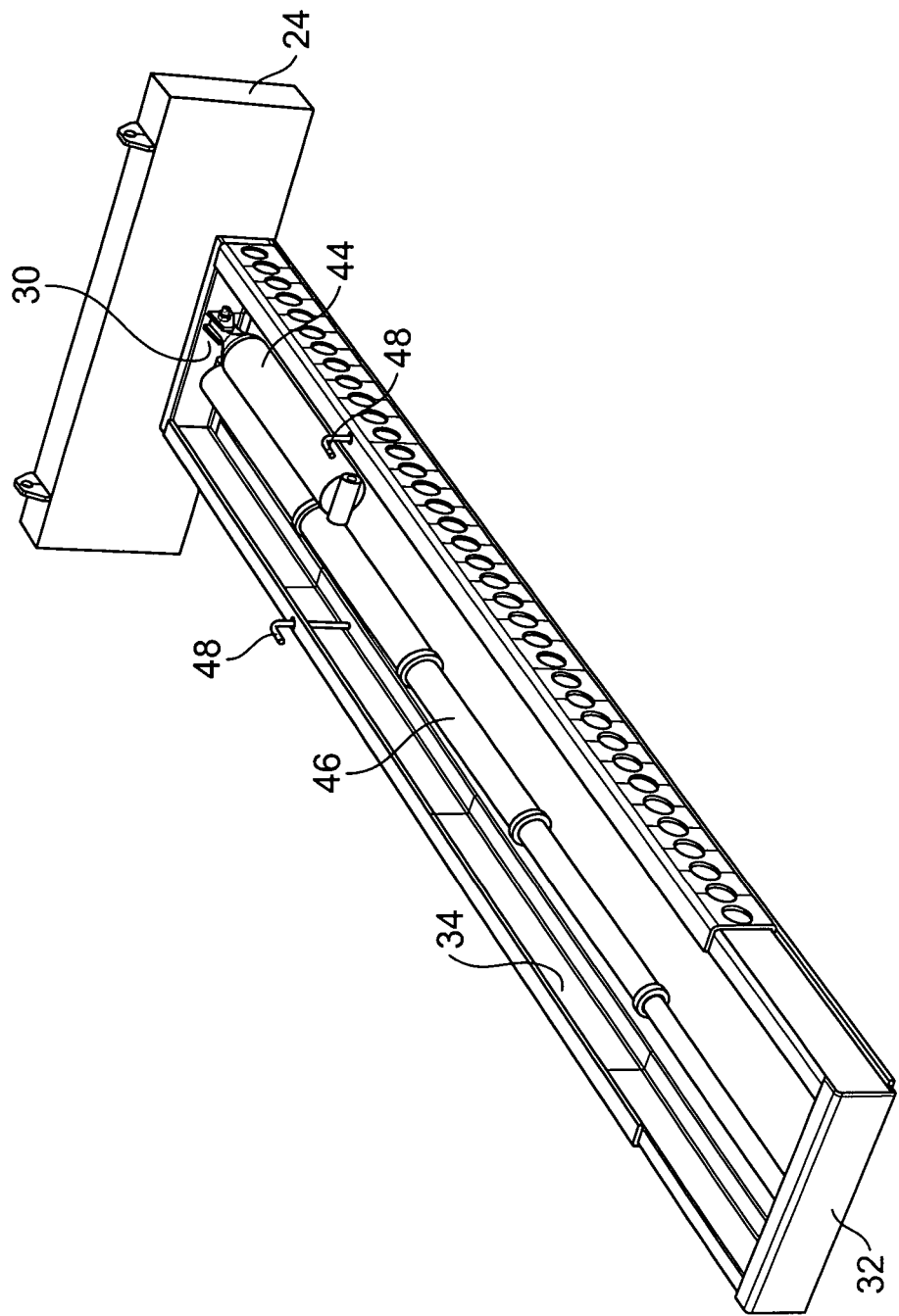
FIG. 4 illustrates an isometric view of a portion of a trailer, according to an embodiment of the present invention.

FIG. 4 illustrates the channel support structure 28 in isolated detail. Two hydraulic dolly actuators 44 and 46 work in a complimentary manner to propel the dolly 18 between the front and rear ends 30 and 32 along the channel support structure 28 by shortening and extending in a telescopic fashion. Extension of the rearward dolly actuator 44 propels the dolly 18 toward the rear end 32 while extension of the frontward dolly actuator 46 propels the dolly 18 toward the front end 30. Removable locking pins 48 can be inserted into the channel support structure 28 to secure the dolly 18 in the travel position. In the travel position, the locking pins 48 intersect the channels 32 and 34 as illustrated in FIGS. 2 and 4. The locking pins 48 prevent rearward rolling of the dolly wheels 42 during driving of the truck 10 and trailer 14.

With reference to FIG. 2, the dolly 18 includes two cantilevered yoke arms 50 that extend rearward from a pivoting axis 52. The yoke arms 50 rotate about the pivoting axis 52 along a path designated by arrow B. Hydraulic yoke actuators 54 control the rotation of the yoke arms 50 by shortening and extending in a telescopic fashion.

Figure 3:
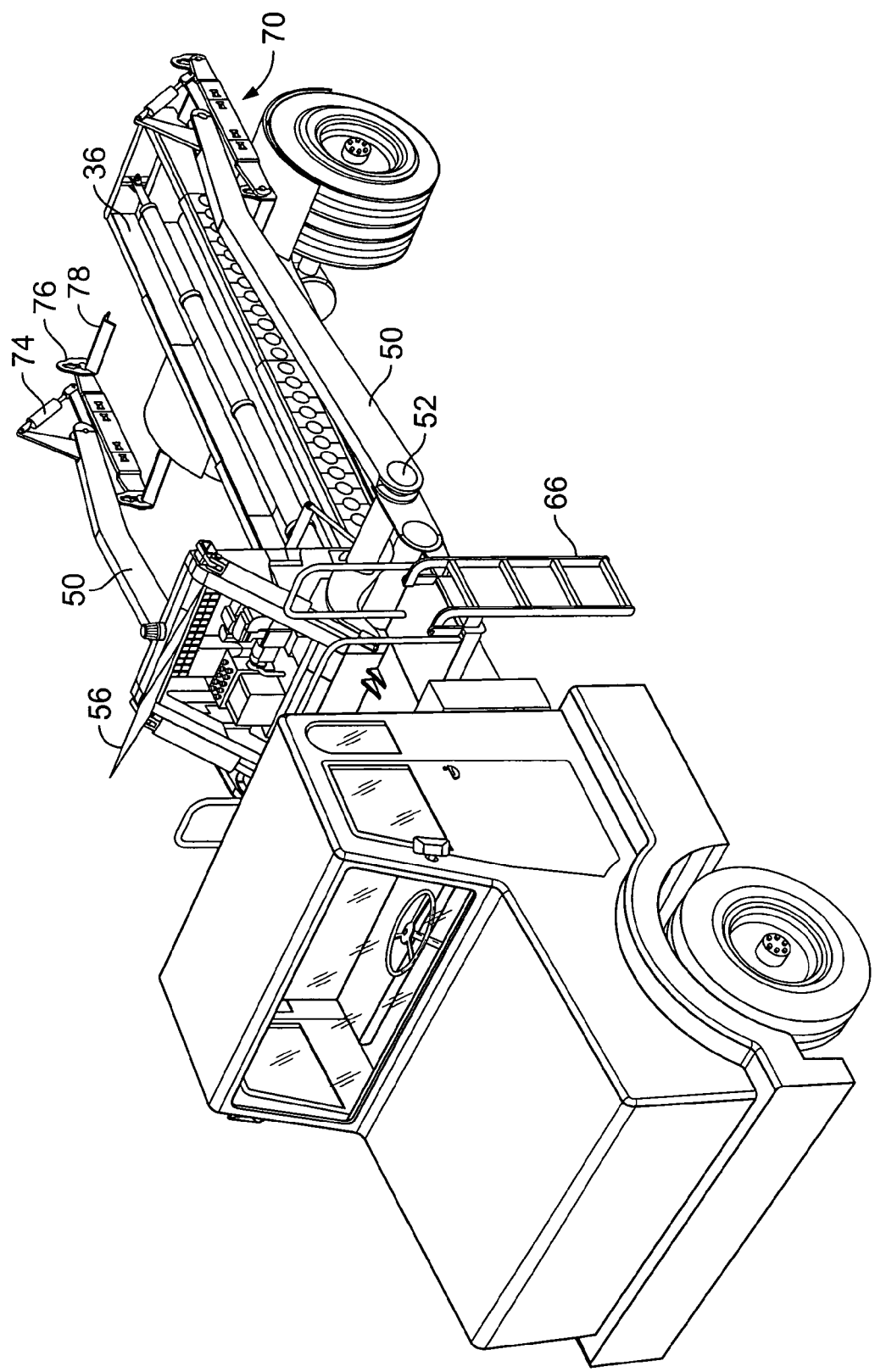
FIG. 3 illustrates an isometric view of a truck and trailer in a second configuration, according to an embodiment of the present invention.
Figure 5:
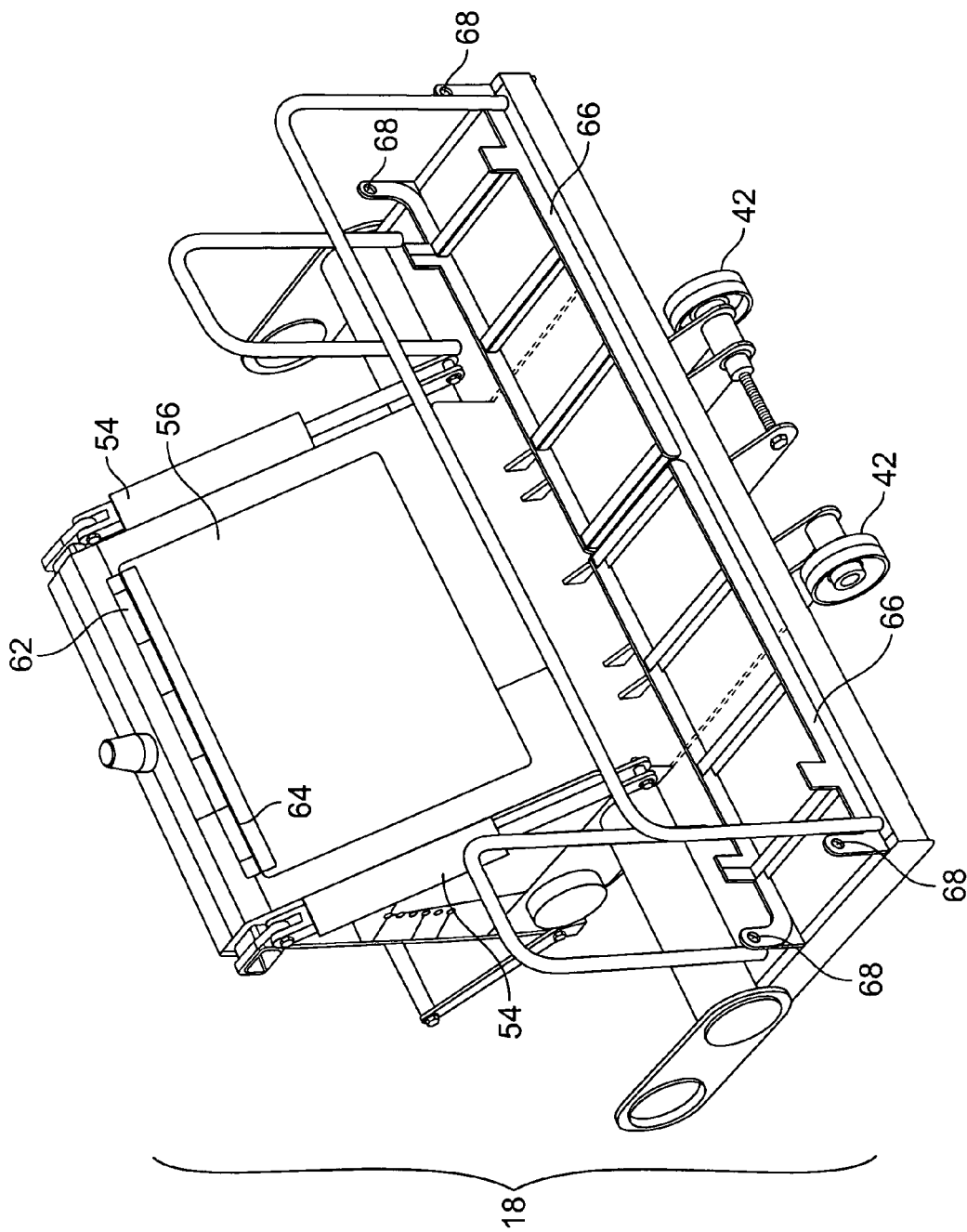
FIG. 5 illustrates an isometric view of a portion of a dolly, according to an embodiment of the present invention.

FIGS. 3 and 5 illustrate the dolly 18 in further detail. (Note, FIG. 5 illustrates the dolly 18 without the yoke arms 50 and the pivoting axis 52.) The dolly 18 includes a hood 56 for accessing a power module 58 contained therein for controlling hydraulic actuators 44, 46, 54, and 74. The hood 56 opens and closes via a hinge 62 located along an upper edge 64 of the hood 56. FIG. 5 illustrates the hood 56 in a closed configuration for operation while FIG. 3 illustrates the hood 56 in an open configuration for service. The dolly 18 also includes service ladders 66 that are rotatable about pivots 68 between a stored configuration (illustrated in FIG. 2) and a deployed configuration (illustrated in FIG. 3).

With respect to FIG. 2, each of the yoke arms 50 includes a cradle assembly 70 located distally from the pivoting axis 52. The cradle assemblies 70 are rotatable about pivots 72 along a path designated by arrow C. Hydraulic cradle actuators 74 control the rotation of the cradle assembly 70 by shortening and extending in a telescopic fashion. Rotation of the cradle assemblies 70 about the pivots 72 allows the cradle assemblies 70 to remain level with respect to the ground despite rotation of the yoke arms 50. By remaining level with the ground, the cradle assemblies 70 can lift and handle the container 12 while maintaining the container 12 in an upright orientation.

Each cradle assembly 70 includes two headed pins 75 protruding medially therefrom. Each headed pin 75 is configured to receive and secure a bracket 76 of a removable lifting extension 78. FIG. 3 illustrates the cradle assemblies 70 with the removable lifting extensions 78 attached while FIG. 2 illustrates the cradle assemblies 70 without the removable lifting extensions 78.

Figure 6:
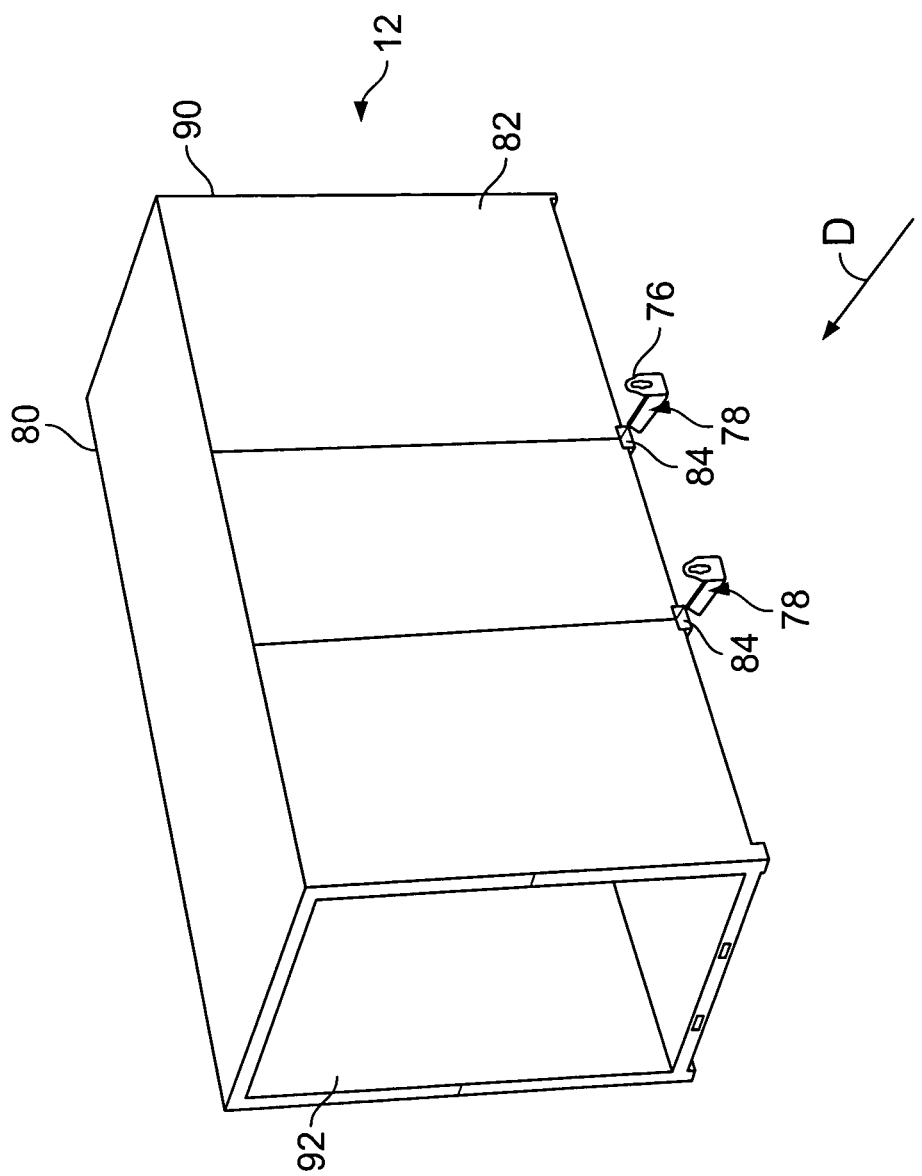
FIG. 6 illustrates an isometric view of a container and lifting extensions, according to an embodiment of the present invention.

FIG. 6 illustrates the container 12. The container 12 includes left and right walls 80 and 82 that include rectangular holes 84 for receiving the removable lifting extensions 78. The holes 84 are located at the bottom of the left and right walls 80 and 82. The container 12 also includes a front wall 90 and a rear opening 92. The rear opening 92 can be closed by well known conventional door means used in the shipping industry (not illustrated). FIG. 6 illustrates the removable lifting extensions 78 aligned for insertion into the holes 84 in a direction designated by arrow D.

With reference to FIG. 1, the dolly 18 includes an engaging bar 94 that extends rearward for contacting containers 12. A light 96 will light up to indicate when the engaging bar 94 is depressed by the front wall 90 of the container 12.

In the unloaded travel position (shown in FIG. 2), the dolly 18 is located and secured at the front end 30 of the channel support structure 28. When the truck 10 arrives at a location to pick up a container 12, the removable lifting extensions 78 are inserted into the holes 84 in the container 12 as contemplated in FIG. 5. The locking pins 48 are removed temporarily to allow the dolly wheels 42 to roll rearward within the channels 34 and 36. With the locking pins 48 removed, the dolly 18 is propelled rearward by the telescopic extension of the rearward dolly actuator 44. As the dolly 18 moves rearward to engage the container 12, the cradle assemblies 70 narrowly pass beyond the left and right walls 80 and 82 of the container 12. If the dolly 18 does not fully engage the container 12, the truck 10 may be driven rearward slightly to adjust.

It is noted that removal of the removable lifting extensions 78 allows for the cradle assemblies 70 to be positioned a distance only slightly greater than the width of the container 12 while still maintaining enough clearance to engage the container 12.

When the dolly 18 fully engages the container 12, the front wall 90 of the container 12 will depress the engaging bar 94. Depressing the engaging bar 94 causes the light 96 to light up thereby indicating that the container 12 is properly positioned relative to the dolly 18 for lifting.

Figure 7:
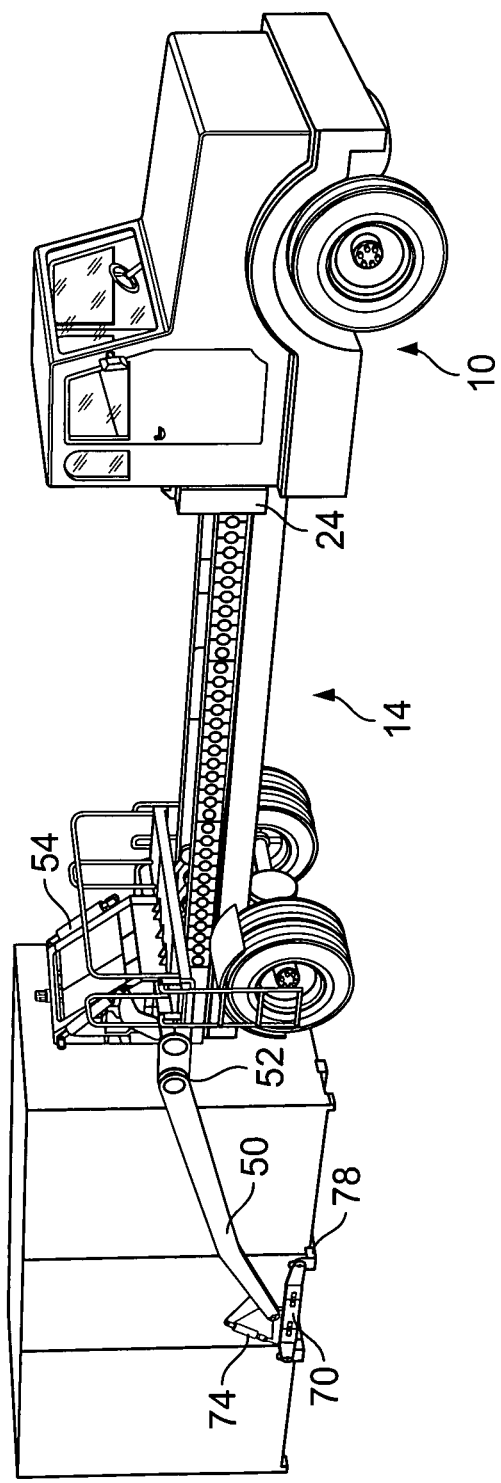
FIG. 7 illustrates an isometric view of a truck with trailer and container in a second configuration, according to an embodiment of the present invention.

The yoke actuators 54 lower the yoke arms 50 to the position shown in FIG. 7. As the yoke arms 50 lower, the cradle actuators 74 rotate the cradle assemblies 70 to maintain the cradle assemblies 70 parallel to the ground. The removable lifting extensions 78, which have already been inserted into the holes 84 of the container 12, are fastened to the cradle assemblies 70 by passing the brackets 76 over the headed pins 75.

The container 12 can now be lifted off the ground by the yoke arms 50. During lifting, the container 12 is kept upright by the cradle assemblies 70 which remain parallel to the ground. The cradle assemblies 70 remain parallel to the ground by rotating about the pivots 72 to compensate for the rotation of the yoke arms 50 about the pivoting axis 52. The truck 10 and trailer 14 are kept upright during lifting by the ballast 24. Without the counterweight of the ballast 24, the weight of the container 12, when being lifted by the dolly 18, could cause the ground-engaging wheels 13 of the truck 10 to lift off of the ground.

Figure 8:
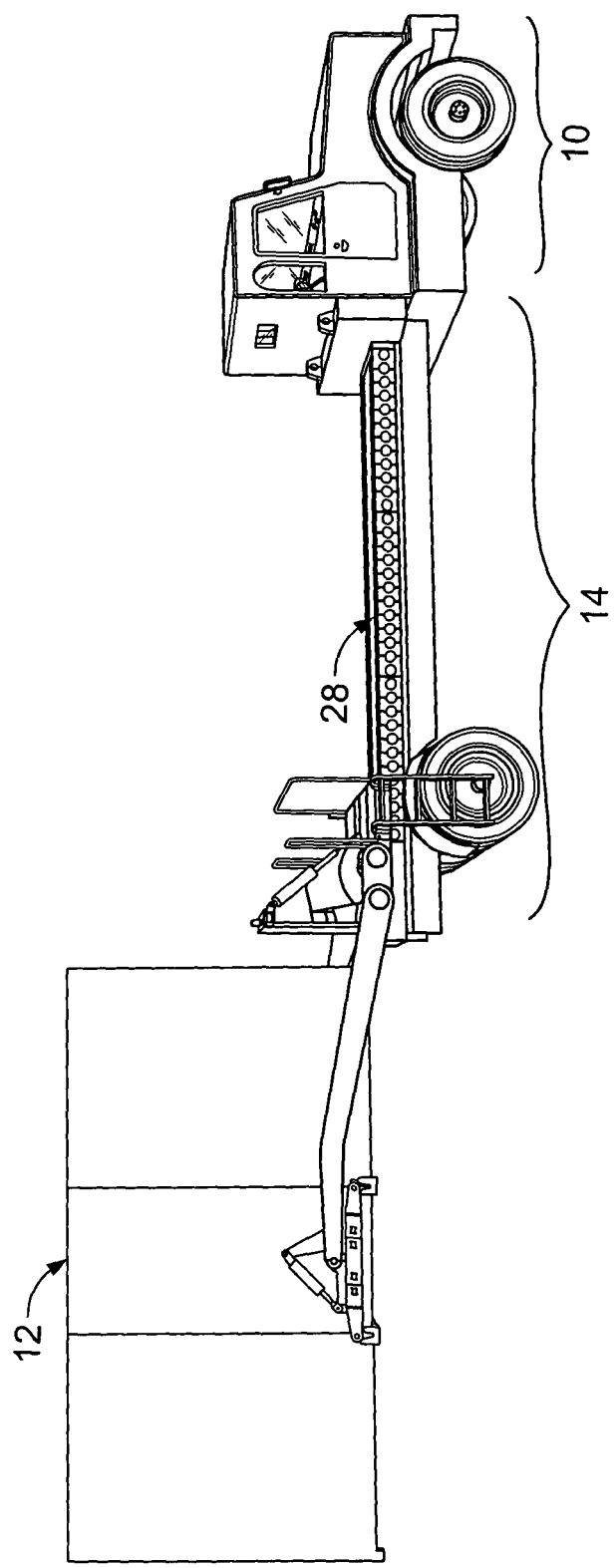
FIG. 8 illustrates an isometric view of a truck with trailer and container in a third configuration, according to an embodiment of the present invention.

Once the container 12 is lifted to a height slightly above the channel support structure 28 as shown in FIG. 8, the dolly 18 is propelled frontward by the frontward dolly actuator 46. When the dolly 18 reaches the front end 30, the dolly 18 is secured by replacing the locking pins 48 and the yoke arms 50 lower the container 12 onto the trailer 14.

The fully loaded position is illustrated in FIG. 1. In that position, the truck 10 is driven to a desired location for unloading. Once at the desired location, the locking pins 48 are removed, and the yoke arms 50 are rotated upward slightly to lift the container 12 off of the channel support structure 28. The dolly 18 is again propelled rearward by the rearward dolly actuator 44. The yoke arms 50 lower the container 12 to the ground. Once the container 12 is resting on the ground, the lifting extensions 78 are detached from the cradle assemblies 70 by passing the brackets 76 over the headed pins 75. The dolly 18 is returned to the unloaded travel position (FIG. 2). The removable lifting extensions 78 are removed from the holes 84 in the container 12 and retained for future use.

Figure 9A:
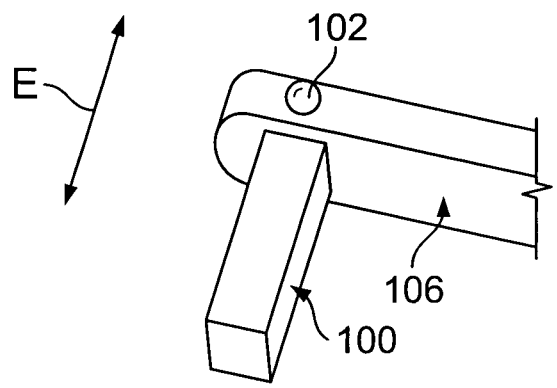
FIGS. 9a and 9b illustrate isometric views of an alternative embodiment of a lifting extension, according to an embodiment of the present invention.
Figure 9B:
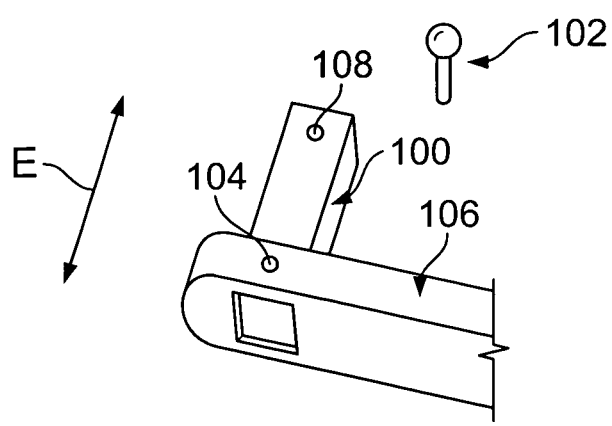

While certain embodiments described above employ a lifting extension 78 that is detachable from the cradle assembly 70, other embodiments may include alternative lifting extensions. For example, FIGS. 9a and 9b illustrate a lifting extension 100 that is slidable transversely in the directions designated by arrow E. A pin 102 is removable from a pinhole 104 in the cradle assembly 106 and a pinhole 108 in the lifting extension 100. When the pin 102 is removed from the pinholes 104 and 108, the lifting extension 100 can be slid laterally to allow the yoke arms 50 to surround a container 12 of maximum width. Once the yoke arms 50 and attached cradle assemblies 106 are positioned around the container 12, the lifting extensions 100 can be slid medially and into holes 84 of the container 12. The pin 102 is then inserted through the pinholes 104 and 108 to secure the lifting extension 100 to the cradle assembly 106.

Figure 10:
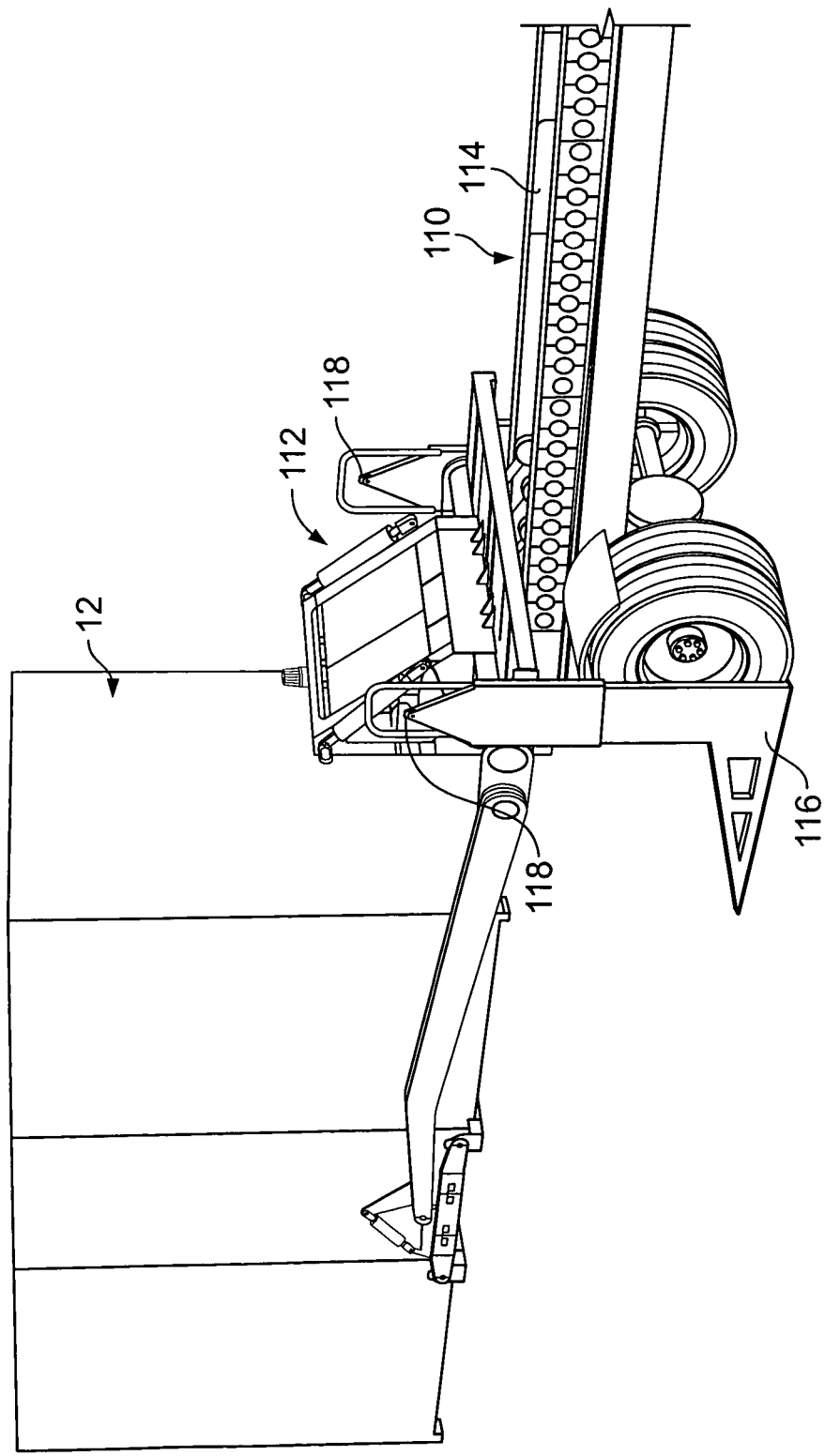
FIG. 10 illustrates an isometric view of a portion of a trailer and container, according to an embodiment of the present invention.

While certain embodiments described above rely on dolly actuators 44 and 46 to move the dolly 18 forward and rearward, other embodiments may include alternative devices for positioning a dolly. For example, a winch and cable system could be used to roll the dolly 18 between the front and rear ends 30 and 32 of the channel support structure 28. Or, the dolly 18 could be stabilized with respect to the ground by outriggers and then rolled forward and rearward by the rearward and forward driving of the truck, respectively. For example, FIG. 10 illustrates a portion of a trailer 110 having an alternative dolly 112 that is rollable along a channel support structure 114. The dolly 110 does not include dolly actuators or a winch and cable to move the dolly 110 along the channel support structure 114. Instead, the dolly 112 is rolled frontward and rearward along the channel support structure by driving the trailer 110 rearward and frontward, respectively. The dolly 112 includes outriggers 116 for contacting the ground as shown in FIG. 10. The outriggers 116 can be raised and lowered via hydraulic outrigger actuators 118 (only the top portions of the outrigger actuators 118 are visible in FIG. 10) that extend in a telescopic fashion. When the outriggers 116 are deployed to contact the ground (the configuration shown in FIG. 10), the dolly 112 becomes fixed in place with respect to the ground. With the dolly 112 fixed in place with respect to the ground, the trailer 110 can be driven rearward or frontward to roll the dolly 112 along the channel support structure 114 in the opposite direction. The outriggers 116 are also used to stabilize the trailer 14 and vehicle (not shown) during lifting. Thus, the embodiment disclosed in FIG. 10 does not require the use of a ballast.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus for lifting and lowering a container of substantially the same width as the apparatus comprising:
    two yoke arms configured to be substantially parallel to and adjacent with left and right sides of the container during lifting and lowering of the container, each of said yoke arms including a cradle that is rotatable about a distal end of each of said yoke arms, each of said cradles including a non-fixed lifting extension configured to be insertable into and removable from a corresponding hole in the container.

2. The apparatus of claim 1, further comprising a hydraulic actuator for rotating said cradle about said distal end of each of said yoke arms.

3. The apparatus of claim 1, further comprising a hydraulic actuator for lifting and lowering said yoke arms by causing said yoke arms to rotate about a pivoting axis upward to lift the container and downward to lower the container.

4. A system for lifting, handling, and transporting a container comprising:
    a container having holes for receiving lifting extensions; and
    a vehicle comprising:
    a propulsion apparatus configured to transport the vehicle from one location to another;
    a trailer apparatus configured to receive and hold said container for transport; and
    a dolly apparatus including yoke arms for lifting and lowering said container in an upright orientation, said yoke arms extending from a pivoting axis on said dolly, said yoke arms rotating about said pivoting axis upward to lift said container and downward to lower said container, said yoke arms being substantially parallel to and adjacent with left and right sides of said container during lifting and lowering of said container,
    wherein each of said yoke arms includes a cradle that rotates about said yoke arm at a pivot, wherein said rotation occurs about only a single axis with respect to said yoke arm, said axis extending through said pivot, each of said cradles including a non-fixed lifting extension configured to be insertable into and removable from one of said holes in said container.

* * * * *